United States Patent
Lübcke et al.

(10) Patent No.: US 6,430,462 B1
(45) Date of Patent: Aug. 6, 2002

(54) SIGNAL PROCESSING METHOD (75) Inventors: Bernd Lübcke, Molfsee; Christian Wiechering, Kiel; Armin Jacht, Roststock, all of (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/424,997
(22) PCT Filed: May 27, 1998
(86) PCT No.: PCT/DE98/01443
§ 371 (c)(1),
(2), (4) Date: Mar. 29, 2000
(87) PCT Pub. No.: WO98/55304
PCT Pub. Date: Dec. 10, 1998

(30) Foreign Application Priority Data

Jun. 2, 1997 (DE) .......................... 197 22 996

(51) Int. Cl.[7] ........................ G06F 19/00; B41C 1/045
(52) U.S. Cl. ...................... 700/160; 700/175; 358/299
(58) Field of Search ................. 700/159–161, 700/169–178; 358/299, 443

(56) References Cited

U.S. PATENT DOCUMENTS

| | | | |
|---|---|---|---|
| 3,769,455 A | 10/1973 | De Vos et al. .............. 358/456 |
| 4,013,831 A | 3/1977 | Dölves et al. .............. 359/299 |
| 4,259,697 A | 3/1981 | Doelves ..................... 358/299 |
| 4,670,271 A | 6/1987 | Pasternak ................... 426/90 |
| 5,422,958 A | 6/1995 | Wouch et al. .............. 382/141 |
| 5,424,845 A | 6/1995 | Holowko et al. ........... 358/299 |
| 5,438,422 A | * 8/1995 | Holowko et al. ........... 358/299 |
| 5,440,398 A | * 8/1995 | Holowko et al. ........... 358/299 |
| 5,617,217 A | 4/1997 | Brewer et al. .............. 358/299 |
| 5,621,533 A | 4/1997 | Holowko et al. ........... 358/299 |
| 5,663,803 A | 9/1997 | Beckett et al. .............. 358/299 |
| 5,825,503 A | * 10/1998 | Brewer et al. .............. 358/299 |
| 5,828,464 A | * 10/1998 | Yoshida et al. ............. 358/299 |
| 5,831,746 A | * 11/1998 | Seitz et al. .................. 358/299 |
| 5,947,020 A | * 9/1999 | Bornhorst, Jr. et al. ....... 101/32 |
| 6,283,019 B1 | * 9/2001 | Dolves ........................ 101/32 |
| 6,348,979 B1 | * 2/2002 | Flannery et al. ............. 358/1.9 |
| 6,357,976 B1 | * 3/2002 | Weidlich .................... 409/131 |

FOREIGN PATENT DOCUMENTS

| | | | |
|---|---|---|---|
| EP | 98/55302 | * | 12/1998 |
| EP | 98/55303 | * | 12/1998 |
| EP | 98/55304 | * | 12/1998 |
| EP | 99/30482 | * | 6/1999 |
| WO | WO 94/19900 | | 1/1994 |
| WO | WO 96/23201 | | 1/1996 |
| WO | WO 96/26837 | | 6/1996 |

* cited by examiner

*Primary Examiner*—Maria N. Von Buhr
(74) *Attorney, Agent, or Firm*—Schiff Hardin & Waite (57) ABSTRACT

The invention relates to a method and a circuit for processing signals in an electronic graving machine, in which a series of cups arranged in a gravure screen is engraved in a printing cylinder by a burin of a graving element guided by an engraving control signal (G). In a digital signal processor (13), a transfer function is determined from function value data used to calculate a periodic screen signal for producing the gravure screen; from adjustment data for adjusting the depth of cut; from digital adjustment parameters for calibrating "light" (white) and "dark" (black); and from control data (SD). The transmission coefficients of the transmission function and/or the transmission function can be modified by the control data (SD). The engraving data (GD), which represent the different tone values between "black" and "white" which are to be engraved, are then converted into engraving control data (GSD) in the digital signal processor (13) after the transmission function. The engraving control data (GSD) undergo digital-analog conversion and the analog engraving control signal (G) is amplified in a current amplifier (16) and fed to the graving element.

19 Claims, 5 Drawing Sheets

SIGNAL PROCESSING METHOD

BACKGROUND OF THE INVENTION

The invention is in the field of electronic reproduction technology and is directed to a method and to a circuit arrangement for signal processing in an electronic engraving machine for engraving printing cylinders for rotogravure.

In an electronic engraving machine, an engraving element having an engraving stylus as a cutting tool moves along a rotating printing cylinder an in axial direction. The engraving stylus controlled by an engraving control signal cuts a sequence of depressions, called cups, arranged in a rotogravure raster into the generated surface of the printing cylinder. The engraving control signal is formed in a signal editing unit by superimposition of an engraving signal representing the gradations between "black" and "white" with a periodic raster signal (vibration). Whereas the raster signal effects a vibrating lifting motion of the engraving stylus for generating the raster, the engraving signal—in conformity with the gradations to be reproduced—controls the cut depths of the cups engraved into the generated surface of the printing cylinder.

Among the things occurring in the signal processing unit are a calibration of the engraving signal to the cut depths of the engraving stylus for "light" (white) and "dark" (black) and the superimposition of the corrected engraving signal with the raster signal for generating the engraving control signal.

In a traditional signal processing unit, the signals are processed in analog fashion in that the input signals are supplied in digital form, are digital-to-analog converted and operated with one another in analog networks, whereby the resulting signal is then amplified in an analog amplifier and is output as an engraving control signal for the engraving element.

Signal processing with analog networks has the disadvantage that the transfer behavior of the networks cannot be optimized without further ado and, due to tolerances and temperature dependencies of the components, is not stable enough in order to generate a good engraving quality.

WO 96/34746 already discloses a method for digital signal processing in an electronic engraving machine, whereby engraving data that represent the gradations to be engraved and function value data that define the periodic raster signal are converted into engraving control data according to a transfer function.

SUMMARY OF THE INVENTION

An object of the present is invention to improve a method and a circuit arrangement for signal processing in an electronic engraving machine for engraving printing cylinders for rotogravure such that the signal processing can be optimized in a simple way in order to achieve a good engraving quality.

According to the method and apparatus of the present invention, for a signal processing in an electronic engraving machine for engraving a printing cylinder for rotogravure with an engraving element controlled by an engraving control signal, a digital transfer function is formed whereby at least one of the transfer function and transfer coefficients of the transfer function are modified by control data. The transfer function is modified by setting parameters for calibrating gradations "black" and "white" to be engraved. Correction data for cut depth correction of the engraving element are provided dependent on at least one engraving data and control data. The transfer function is additionally corrected by the correction data for compensating a mechanical wear of the engraving stylus. Engraving control data are generated according to the transfer function from engraving data that represent gradations between "black" and "white" to be engraved and from function value data that represent a periodic raster signal for generating a raster. The engraving control data are converted into said amplified analog engraving control signal. An engraving stylus of the engraving element controlled by the engraving control signal engraves a sequence of cups arranged in the raster into the printing cylinder, and the engraving element executes a feed motion along the printing cylinder directed in an axial direction of the printing cylinder for engraving of the cups.

The invention is explained in greater detail below with reference to FIGS. 1 through 5.

BRIEF DESCRIPTION OF THE DRAWINGS

Shown are.

DESCRIPTION OF THE PREFERRED EMBODIMENTS

Figure 1:
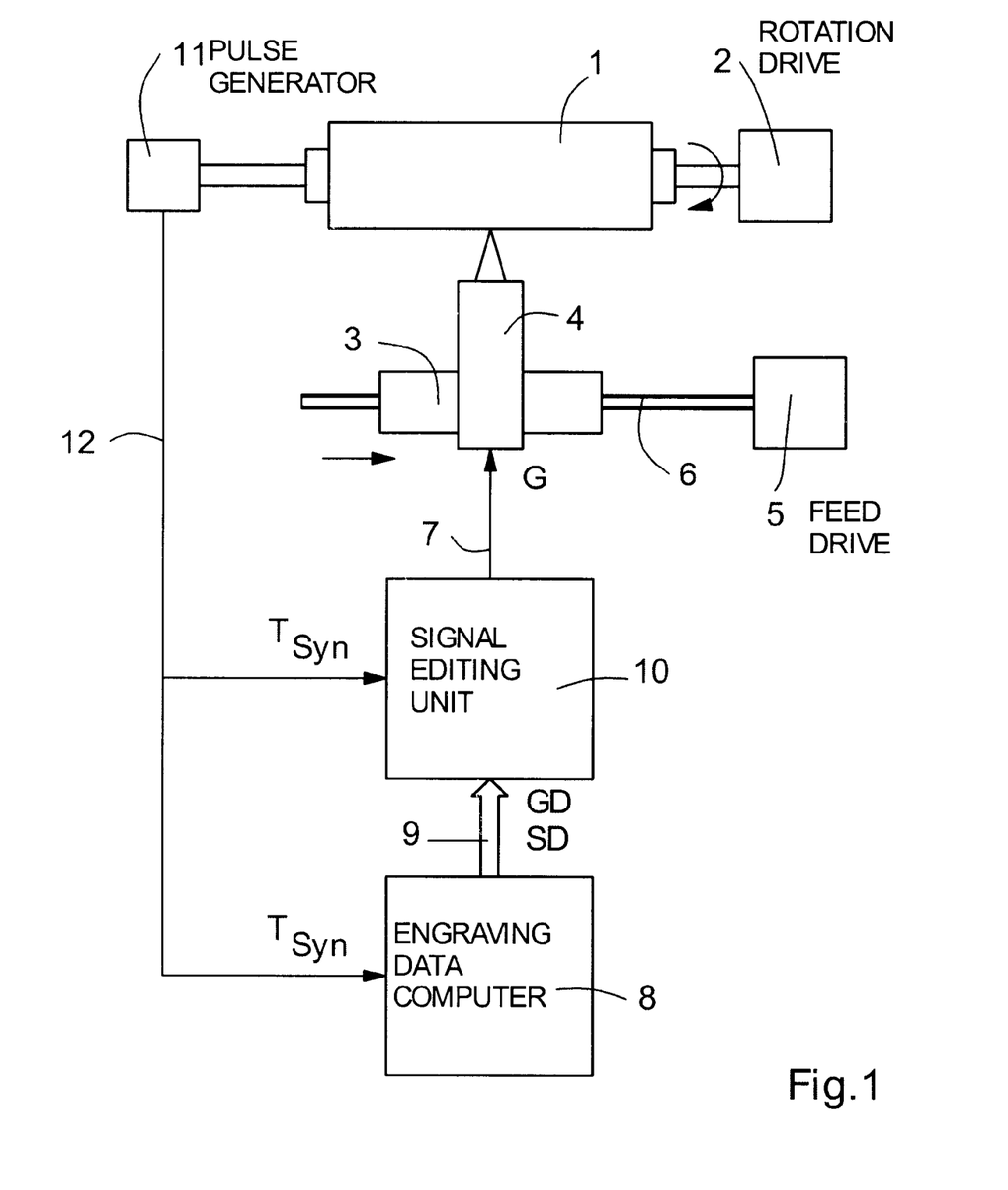
FIG. 1 is a schematic block circuit diagram of an engraving machine for engraving printing cylinders comprising a signal editing unit.

FIG. 1 shows a schematic block circuit diagram of an engraving machine for engraving printing cylinders. A printing cylinder 1 is rotationally driven by a rotation drive 2. An engraving element 4 having an engraving stylus as a cutting tool and mounted on an engraving carriage 3 moves along the rotating printing cylinder wall 1 in axial direction with the assistance of a spindle 6 driven by a feed drive 5.

The engraving stylus of the engraving element 4 controlled by an analog engraving control signal (G) on a line 7 cuts a sequence of cups arranged in a rotogravure raster engraving line by engraving line into the generated surface of the rotating printing cylinder 1 while the engraving element 4 moves axially along the printing cylinder 1. For example, the engraving element 4 is designed as an engraving element with an electromagnetic drive for the engraving stylus.

Whereas a periodic raster signal effects a vibrating lifting motion of the engraving stylus for generating the rotogravure raster, engraving data (GD)—corresponding to the gradations between "light" and "dark" to be engraved—define the penetration depths of the engraving stylus into the generated surface of the printing cylinder 1.

The engraving data (GD) are offered in an engraving data computer 8 engraving line by engraving line, whereby an engraving datum of at least one byte is allocated to each cup to be engraved, this containing, among other things, the gradation to be engraved as engraving information. Control data (SD) for the signal processing are also offered in the engraving data computer 8.

Engraving data (GD) and control data (SD) are forwarded via a data bus 9 to a signal processing unit 10 in which the engraving control signal (G) for the engraving element 4 is generated.

For a synchronization of the signal processing with the rotational movement of the printing cylinder 1, a pulse generator 11 is mechanically coupled to the printing cylinder 1. The pulse generator 11 generates a synchronization clock sequence ($T_{SYN}$) that is forwarded via a line 12 to the engraving data computer 8 and to the signal editing unit 10.

Figure 2:
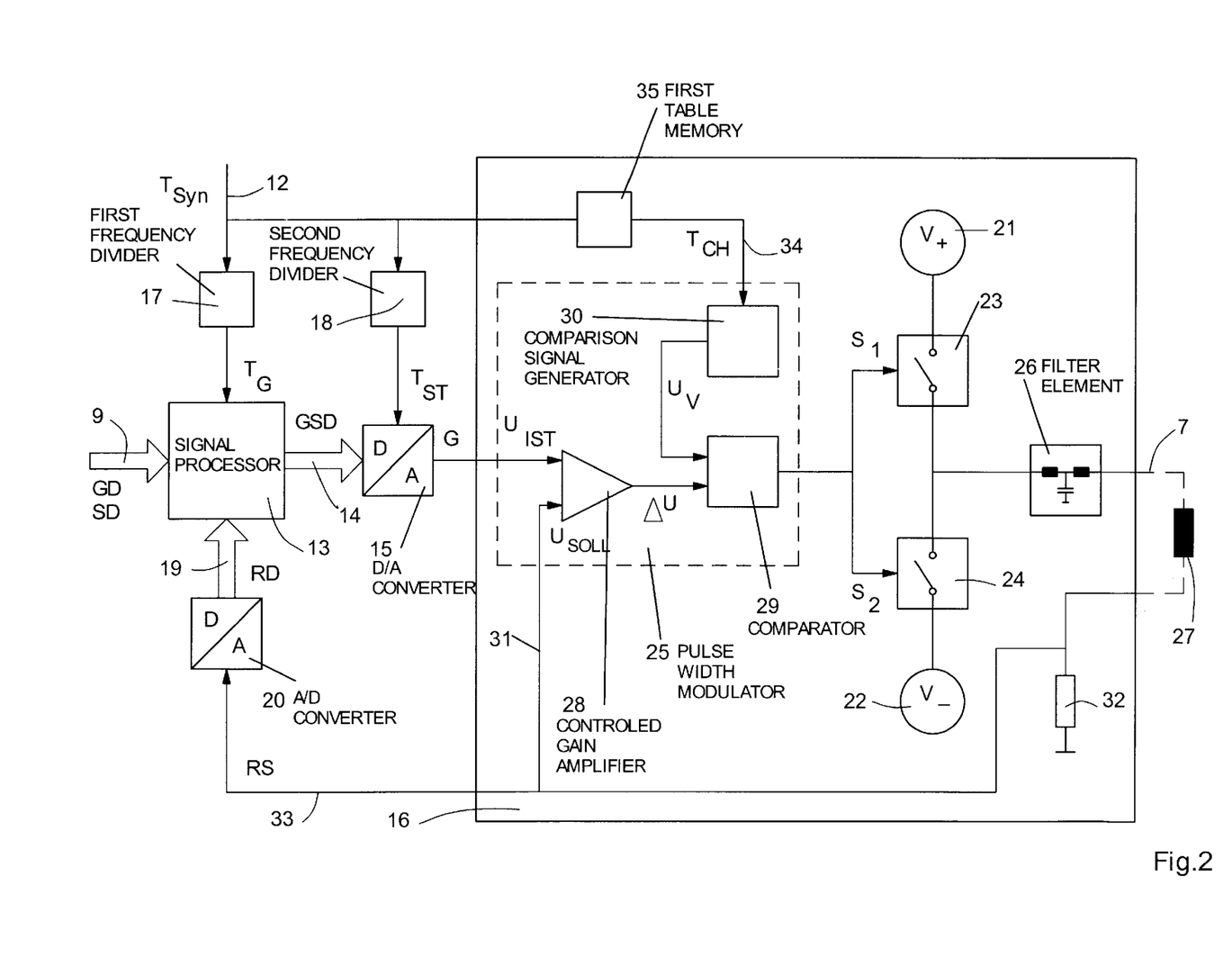
FIG. 2 is a first exemplary embodiment of the inventive signal editing unit.

FIG. 2 shows a first exemplary embodiment of the inventive signal editing unit 10.

In the signal editing unit 10, the engraving data (GD) and the control data (SD) are communicated via the data bus 9 to a signal processor 13. In the signal processor 13, the periodic raster signal (vibration) for generating the rotogravure raster is calculated from stored function value data (FD). In a lookup table (LUT), further, correction data (KD) for a correction of the cut depth of the engraving stylus and setting values "light" ($EP_L$) and "dark" ($EP_T$) are deposited in addressable fashion in the signal processor 13.

In the signal processor 13, the engraving data (GD) are inventively numerically converted into engraving control data (GSD) by a transfer function, whereby the transfer coefficients ($k_x$) of the transfer function and/or the transfer function itself can be advantageously modified by the control data (SD). The control data (SD), for example, influence the setting values for "light" ($EP_L$) and "dark" ($EP_T$), amplitude and phase of the raster signal (vibration) via the function value data (FD) and the correction data (KD) for the correction of the cut depth, whereby the setting values "light" influence the gain and the setting values "dark" influence the offset of the signal processor 13.

The transfer function is thereby determined by the function value data (FD) of the raster signal, by the correction data (KD) for the correction of the cut depth and by the setting values for "light" ($EP_L$) and "dark" ($EP_T$), so that, for example, the engraving control data (GSD) derive as follows from the engraving data (GD):

$$GSD = (GD \times k_1 + KD \times k_2) \times (EP_L \times k_3) + EP_T \times k_4 + FD \times k_5$$

Denoted in this equation are:

| | |
|---|---|
| GD | Engraving data (input data) |
| GSD | Engraving control data (output data) |
| EP | Setting values |
| FD | Function value data |
| KD | Correction data, and |
| $k_x$ | Transfer coefficient |

A processor that enables fast floating decimal point operations is employed as signal processor 13, preferably a digital signal processor (DSP). For example, the digital signal processor of the type TMS 320C31 of Texas Instruments can be utilized as signal processor 13. Given such a digital signal processor, the input data and/or the calculation and operation algorithms for the input data can be advantageously modified via the control data.

The engraving control data (GSD) output from the signal processor 13 proceed via a data bus 14 onto at least one D/A converter 15 that generates the analog engraving control signal (G). The analog engraving control signal (G) is then amplified in a following, analog power amplifier 16 and is output via the line 7 to the engraving element 4.

An engraving clock sequence ($T_G$) is derived in a first frequency divider 17 from the synchronization clock sequence ($T_{SYN}$) by frequency step-down. This engraving clock sequence ($T_G$) synchronizes the signal processing in the signal processor 13. A control clock sequence ($T_{ST}$) generated in a second frequency divider 18 synchronizes the D/A converter 15. The frequency of the engraving clock sequence ($T_G$) determines the frequency of the periodic raster signal (engraving frequency) and, together with the circumferential speed of the printing cylinder 1 and the axial feed rate of the engraving element 4, thus determines the geometry of the rotogravure raster during engraving.

The employment of a digital signal processor enables the connection of a plurality of D/A converters that can be selectively activated by address bits contained in the output data of the signal processor 13. Further, feedback data (RD) for a digital control can be supplied via a control bus 19 to the signal processor 13. For that purpose, analog feedback signals (RS) are converted into the feedback data (RD) in an A/D converter 20.

The analog power amplifier 16 is preferably designed as a switched power amplifier, so that a high efficiency is achieved in the signal amplification.

The switched power amplifier 16 is essentially composed of a voltage source—of two voltage sources 21, 22 for the voltages ($V_+$) and ($V_-$) in the exemplary embodiment–of two electronic switches 23, 24 designed, for example, as switching transistors that can be actuated by pulse-width-modulated control signals ($S_1$, $S_2$), of a pulse-width modulator 25 for generating the control signals ($S_1$, $S_2$) and of a filter element 26.

The excitation coil 27 of the electromagnetic drive system of the engraving element 4 is indicated as a load in broken lines, this being permeated by the amplified output current of the switched power amplifier 16 as engraving control signal (G) for the engraving element 4 on the line 7. Due to the cut-in and cut-out of the voltage sources 21, 22, a square-wave voltage having the amplitudes $V_+$ and $V_+$ arises at the input of the filter element 26, this being smoothed by the filter element 26, so that a medium DC voltage is available at the output of the filter element 26 whose size is dependent on the turn-on intervals of the electronic switches 23, 24.

The pulse-width modulator 25 is composed of a controlled gain amplifier 28, of a comparator 29 and of a comparison signal generator 30. The engraving control signal (G) is supplied to the controlled gain amplifier 28 from the A/D converter 15 as a rated voltage ($U_{SOLL}$), and an actual voltage ($U_{IST}$) is supplied thereto via a line 31 as a criterion for the output current of the power amplifier 16 that is generated as a voltage drop at a precision resistor 32.

The output error ($\Delta U$) formed in the controlled gain amplifier 25 is supplied to the one input of the comparator 29, whose second input is charged with a sawtooth-shaped or $\Delta$-shaped comparison voltage ($U_v$) acquired in the comparison generator 30. In the comparator 29, the comparison voltage ($U_v$) is compared to the output error ($\Delta U$), and the pulse-width-modulated control signals ($S_1$, $S_2$) are acquired from the comparison, the pulse widths being proportional to the output error ($\Delta U$).

The actual voltage ($U_{IST}$) can also be fed back as feedback signal (RF) via a line 33 onto the AND converter 20 for the purpose of a digital control upon involvement of the signal processor 13.

The comparison signal generator 30 is synchronized by a chopper clock sequence ($T_{CH}$) on a line 34.

When the chopper clock sequence ($T_{CH}$) is generated in a clock generator that is not coupled with rigid phase to the synchronization clock sequence ($T_{SYN}$) or to the engraving clock sequence ($T_G$), it proves advantageous to employ a chopper clock sequence ($T_{CH}$) with a chopper frequency modulated by a noise signal. What "infesting" the chopper clock sequence ($T_{CH}$) with noise advantageously achieves is that a stable engraving control signal (G) is generated in the power amplifier 16, as a result whereof periodic patterns that are disturbing in the engraving are prevented, these reducing the engraving quality.

In order to prevent such disturbing patterns, as an alternative, it proves advantageous to rigidly couple the chopper frequency of the chopper clock sequence ($T_{CH}$) and the engraving frequency of the engraving clock sequence ($T_G$) with one another, preferably with a specific frequency ratio.

In this case, the chopper clock sequence ($T_{CH}$)—as shown in FIG. 2—can be generated by frequency division with a frequency step-down means 35, being generated from the synchronization clock sequence ($T_{SYN}$). Alternatively, the chopper clock sequence ($T_{CH}$) can also be derived from the engraving clock sequence ($T_G$) with the engraving frequency on the basis of a frequency multiplication with a phase locked loop circuit (PLL circuit). The chopper frequency, advantageously, is a multiple of the engraving frequency and is optimized in view of the properties of the switched power amplifier 16, for example in view of the filter properties of the filter element 26.

Figure 3:
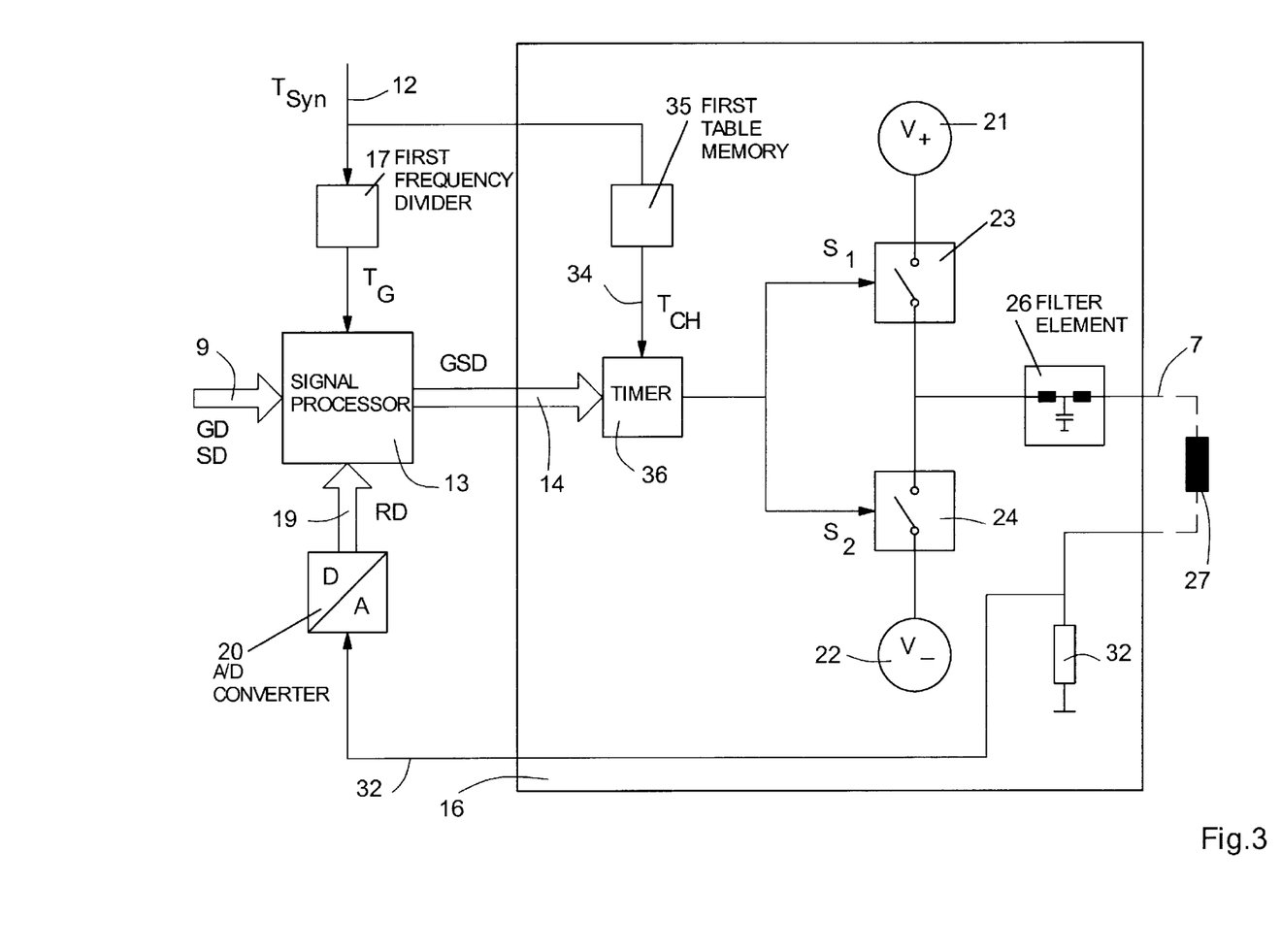
FIG. 3 is a second exemplary embodiment of the inventive signal editing unit.

FIG. 3 shows a second exemplary embodiment of the inventive signal processing unit 1, which differs from the first exemplary embodiment in that the D/A converter 15 is eliminated and the pulse-width modulator 25 in the switched power amplifier 16 is replaced by a timer 36. The timer 36 is directly driven by engraving control data (GSD) at the output of the signal processor 13 and converts the engraving control data (GSD) into the pulse-width-modulated control signals ($S_1$, $S_2$) for the two electronic switches 23, 24.

In this case, the timer 36 is synchronized by a chopper clock sequence ($T_{CH}$) on the line 34, whereby the chopper clock sequence ($T_{CH}$) can be generated in the same way as in the exemplary embodiment in FIG. 2. Given employment of a timer, the chopper clock sequence ($T_{CH}$) can also be additionally noise-infested by a random signal acquired in a numeric random generator.

Figure 4:
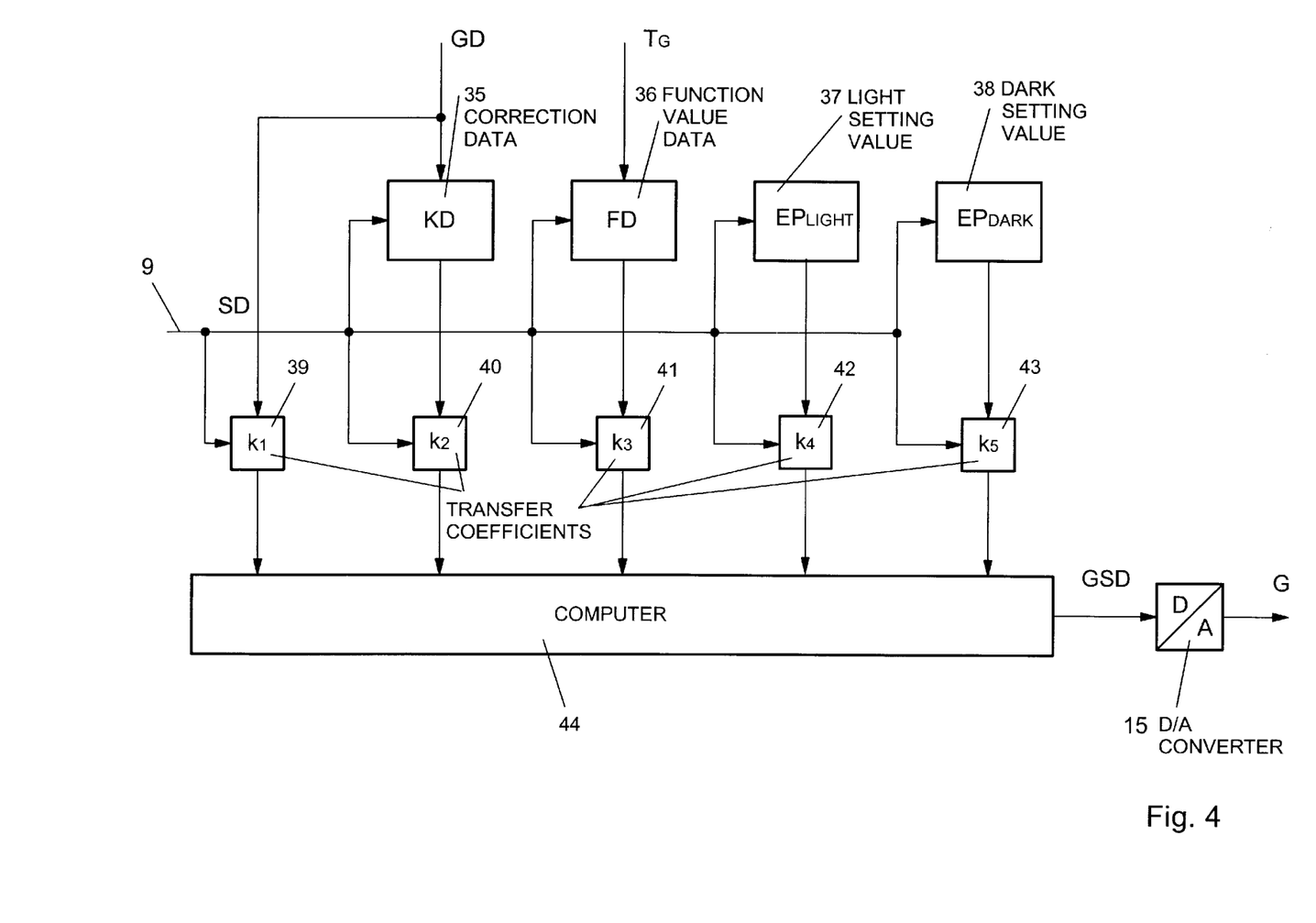
FIG. 4 is a first exemplary embodiment of a signal processor.

FIG. 4 shows a first exemplary embodiment of a signal processor 13. The signal processor 13 comprises two table memories 35, 36 and two parameter memories 37, 38. The correction value table KD=f (GD) for correction of the cut depth is loaded in the first table memory 36, and a vibration table of function value data (FD) for generating the vibration is loaded in the second table memory 36. New tables can be loaded with the assistance of the control data (SD) on the data bus 9. For example, the phase and the shape of the vibration signal can be modified by modifying the vibration table. The parameter memories 37, 38 contain the setting values ($EP_L$; $EP_T$) for settings "light" and "dark".

The first table memory 35 is addressed by the engraving data (GD). The function value data (FD) are read out from the second table memory 36 by the engraving clock sequence ($T_G$). The setting values ($EP_L$, $EP_T$) required for calibration are called by the control dat (SD). The engraving data (GD) on the data bus 9 and the quantities read out from the respective memories 35, 36, 37, 38 are weighted in the multiplier units 39, 40, 41, 42, 43 with the transfer coefficients ($k_s$) stored therein, these being capable of being modified by the control data (SD).

The weighted quantities are supplied to a computer 44 in which the engraving control data (GSD) are calculated according to the equation $$GSD = (GD \times k_1 + KD \times k_2) \times (EP_L \times k_3) + EP_T \times k_4 + FD \times k_5$$

and are then converted into the analog engraving control signal (G) in the digital-to-analog converter 15.

Figure 5:
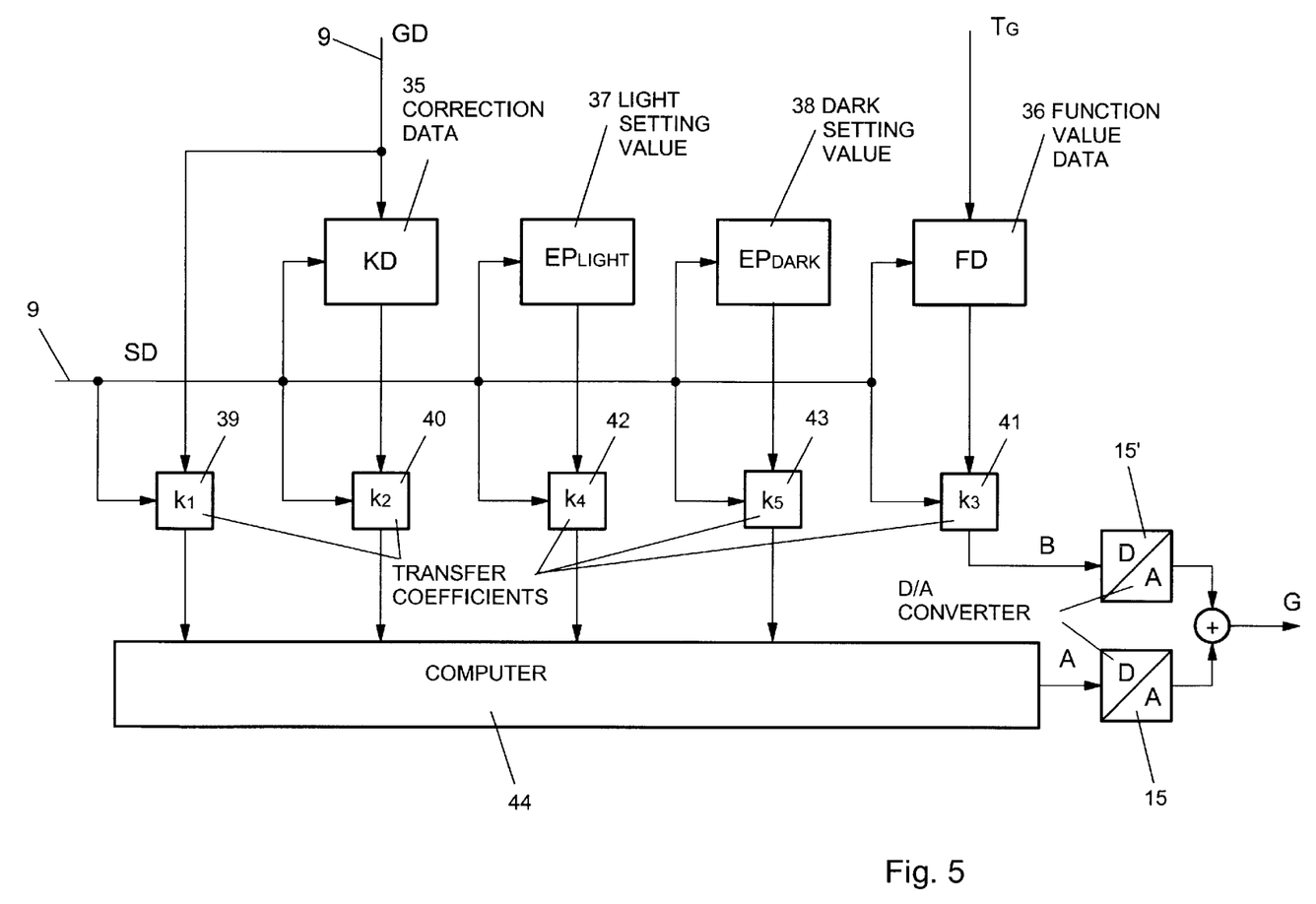
FIG. 5 is a second exemplary embodiment of a signal processor.

FIG. 5 shows a second exemplary embodiment of the signal processor 13, whereby the engraving data (GD) and the function value data (FD) for generating the vibration are further-processed in two separate processing branches. First data $$A = (GD \times k_1 + KD \times k_2) \times (EP_L \times k_3) + EP_T \times k_4$$

are calculated in the computer 44 and are converted into a first analog signal (A) in the D/A converter 15. Second data $$B = FD \times k_5$$

are converted into an analog, second signal (B) in a separate D/A converter 15'). Subsequently, the first signal (A) and the second signal (B) are operated in analog fashion to form the analog engraving control signal (G). In this exemplary embodiment, a filtering for improving the engraving control signal (G) can be advantageously undertaken in the processing branch of the engraving data.

Although various minor changes and modifications might be proposed by those skilled in the art, it will be understood that our wish is to include within the claims of the patent warranted hereon all such changes and modifications as reasonably come within our contribution to the art.

We claim:

1. A method for signal processing in an electronic engraving machine for engraving a printing cylinder for rotogravure with an engraving element controlled by an amplified analog engraving control signal, comprising the steps of:

forming a digital transfer function whereby at least one of the transfer function and transfer coefficients of the transfer function are modified by control data;

modifying the transfer function by setting parameters for calibrating gradations "black" and "white" to be engraved;

providing correction data for a cut depth correction of the engraving element dependent on at least one of engraving data and control data;

additionally correcting the transfer function by the correction data for compensating a mechanical wear of the engraving stylus;

generating engraving control data according to the transfer function from engraving data that represent gradations between "black" and "white" to be engraved and from function value data that represent a periodic raster signal for generating a raster;

converting the engraving control data into said amplified analog engraving control signal; and engraving with an engraving stylus of the engraving element controlled by the engraving control signal a sequence of cups arranged in the raster into the printing cylinder, and executing with the engraving element a feed motion along the printing cylinder directed in an axial direction of the printing cylinder for engraving of the cups.

2. The method according to claim 1 wherein a digital signal processor is employed for signal processing.

3. The method according to claim 1 wherein a synchronization clock sequence is generated from the rotational movement of the printing cylinder; and the signal processing with the transfer function is controlled by a clock sequence derived from the synchronization clock sequence by frequency division.

4. The method according to claim 3 wherein the frequency of the derived clock sequence corresponds to the frequency of the periodic raster signal.

5. The method according to claim 1 wherein the analog engraving control signal for the drive of the engraving element is amplified in a switched power amplifier.

6. The method according to claim 5 wherein the switched power amplifier is synchronized by a chopper clock sequence.

7. The method according to claim 6 wherein
the chopper clock sequence is generated in a clock generator that is not synchronized with the rotational movement of the printing cylinder; and
the frequency of the chopper clock sequence is modulated by a noise signal.

8. The method according to claim 6 wherein
a synchronization clock sequence derived from the rotational movement of the printing cylinder is generated; and
the chopper clock sequence is derived from the synchronization clock sequence by frequency division.

9. The method according to claim 6 wherein the chopper clock sequence is derived from an engraving clock sequence by frequency multiplication, the frequency of said engraving clock sequence corresponding to the frequency of the raster signal.

10. The method according to claim 6 wherein the frequency of the chopper clock sequence is a multiple of the frequency of the engraving clock sequence or of the frequency of the periodic raster signal.

11. The method according to claim 1 wherein
the amplified engraving control signal is converted into feedback data; and
feedback data modify the transfer function.

12. A method for signal processing in an electronic engraving machine with an engraving element controlled by an amplified engraving control signal, comprising the steps of:
forming a digital transfer function whereby at least one of the transfer function and transfer coefficients of the transfer function are modified by control data;
modifying the transfer function by setting parameters for calibrating gradations "dark" and "light" to be engraved;
providing correction data for a cut depth correction of the engraving element dependent on at least one of engraving data and control data;
additionally correcting the transfer function by the correction data for compensating a mechanical wear of the engraving stylus;
generating engraving control data according to the transfer function from engraving data that represent gradations between "dark" and "light" to be engraved and from function value data that represent a periodic raster signal for generating a raster;
converting the engraving control data into said amplified engraving control signal; and
engraving with the engraving element.

13. A circuit arrangement for signal processing in an electronic engraving machine for engraving printing cylinders for rotogravure with an engraving element having an engraving stylus and controlled by an engraving control signal, comprising:
an engraving data memory for providing engraving data that represent gradations between "black" and "white" to be engraved;
a signal processor connected to the engraving data memory in which a digital transfer function is formed, at least one of the transfer function and transfer coefficients of the transfer function are modified by control data, the transfer function being modified by setting parameters for calibrating the gradations "black" and "white" to be engraved, and in which engraving control data are generated according to the transfer function from engraving data that represent gradations between "black" and "white" to be engraved and from function value data that represent a periodic raster signal for generating a raster;
a D/A converter connected to the signal processor for conversion of the engraving control data into the engraving control signal;
an amplifier following the D/A converter for amplification of the engraving control signal for the engraving element; and
the signal processor comprises a correction data memory from which correction data for a cut depth correction of the engraving element are read out dependent on at least one of engraving data and control data in order to correct the transfer function for compensating a mechanical wear of the engraving stylus.

14. The circuit arrangement according to claim 13 wherein the processor is designed as a digital signal processor.

15. The circuit arrangement according to claim 13 wherein the amplifier is designed as switched power amplifier.

16. The circuit arrangement according to claim 15 wherein the switched power amplifier comprises:
at least one voltage source;
two series-connected electronic switches controllable by pulse-width-modulated control signals connected between the voltage sources between the one voltage source and ground;
a filter element an input of which is connected to the two electronic switches and an output of which forms the output of the power amplifier; and
a pulse width modulator being connected to the electronic switches for generating the control signals.

17. The circuit arrangement according to claim 16 wherein the pulse width modulator is composed of a controlled gain amplifier, of a comparator and of a comparison generator.

18. The circuit arrangement according to claim 16 wherein the pulse width modulator is composed of a timer.

19. A circuit arrangement for signal processing in an electronic engraving machine for engraving printing cylinders with an engraving element and controlled by an engraving control signal, comprising:
an engraving data memory for providing engraving data that represent gradations between "dark" and "light" to be engraved;
a signal processor connected to the engraving data memory in which a digital transfer function is formed, at least one of the transfer function and transfer coefficients of the transfer function are modified by control data, the transfer function being modified by setting parameters for calibrating the gradations "dark" and "light" to be engraved, and in which engraving control data are generated according to the transfer function from engraving data that represent gradations between "dark" and "light" to be engraved and from function value data that represent a periodic raster signal for generating a raster;
a D/A converter connected to the signal processor for conversion of the engraving control data into the engraving control signal; and the signal processor comprises a correction data memory from which correction data for a cut depth correction of the engraving element are read out dependent on at least one of engraving data and control data in order to correct the transfer function for compensating a mechanical wear of the engraving elements.

* * * * *